United States Patent
Chen et al.

(10) Patent No.: US 11,186,198 B2
(45) Date of Patent: Nov. 30, 2021

(54) METHODS AND SYSTEMS FOR VEHICLE BATTERY CELL FAILURE DETECTION AND OVERCHARGE PROTECTION

(71) Applicant: Ford Global Technologies, LLC, Dearborn, MI (US)

(72) Inventors: Hanyang B. Chen, Canton, MI (US); Michael J. Irby, Monroe, MI (US); Jeff Raymond Mohr, Shelby Township, MI (US); Anthony Hartman, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 308 days.

(21) Appl. No.: 16/428,883

(22) Filed: May 31, 2019

(65) Prior Publication Data

US 2020/0376978 A1    Dec. 3, 2020

(51) Int. Cl.
*H02J 7/00*    (2006.01)
*B60L 58/12*    (2019.01)
(Continued)

(52) U.S. Cl.
CPC ............ *B60L 58/12* (2019.02); *B60L 53/62* (2019.02); *B60L 58/15* (2019.02); *G07C 5/0808* (2013.01);
(Continued)

(58) Field of Classification Search
CPC ...... B60L 58/12; B60L 2240/80; B60L 53/62; B60L 2250/10; G07C 5/0808;
(Continued)

(56) References Cited

U.S. PATENT DOCUMENTS 4,595,880 A * 6/1986 Patil .................... G01R 31/3842
                                                      324/427
4,991,435 A * 2/1991 Colarossi ............ G01F 23/0084
                                                      377/21
(Continued)

FOREIGN PATENT DOCUMENTS

CN         107264449 A     10/2017
DE         3308515 A1 *   9/1983 ........... H02J 7/00714
(Continued)

OTHER PUBLICATIONS

Graham Prophet, *Detecting High Voltage Battery Isolation Failures in Electric Vehicles*, Apr. 28, 2017, 3 pages.
(Continued)

*Primary Examiner* — John T Trischler
(74) *Attorney, Agent, or Firm* — Frank Lollo; Eversheds Sutherland (US) LLP

(57) ABSTRACT

Systems and methods for monitoring the health of a vehicle battery. A method includes determining an initial amp-hour value for a vehicle battery of a vehicle. The method also includes measuring a net integrated amp-hour value added into the vehicle battery during a first time period. The method further includes determining that the initial amp-hour value plus the net integrated amp-hour value is greater than a threshold percentage of a rated capacity of the vehicle battery. And the method still further includes responsively providing an alert to a driver.

18 Claims, 4 Drawing Sheets

(51) Int. Cl.
*G07C 5/08* (2006.01)
*B60L 53/62* (2019.01)
*B60L 58/15* (2019.01)

(52) U.S. Cl.
CPC .......... *G07C 5/0816* (2013.01); *H02J 7/0029* (2013.01); *H02J 7/0047* (2013.01); *H02J 7/0048* (2020.01); *H02J 7/00302* (2020.01); *H02J 7/00716* (2020.01); *B60L 2240/547* (2013.01); *B60L 2240/80* (2013.01); *B60L 2250/10* (2013.01); *Y02T 10/7072* (2013.01)

(58) Field of Classification Search
CPC .............. G07C 5/0816; H01M 2220/20; H02J 7/00716; H02J 7/0048; H02J 7/00302; H02J 7/0029; H02J 7/0047
USPC ....................................................... 320/109
See application file for complete search history.

(56) References Cited

U.S. PATENT DOCUMENTS

| | | | |
|---|---|---|---|
| 5,444,378 A | 8/1995 | Rogers | |
| 5,730,243 A * | 3/1998 | Koike | B60L 3/00 180/220 |
| 5,963,140 A * | 10/1999 | Kawaguchi | G01R 31/371 340/815.58 |
| 5,994,876 A * | 11/1999 | Canny | G01R 31/3648 320/132 |
| 6,094,052 A * | 7/2000 | Arai | G01R 31/36 324/427 |
| 6,211,653 B1 * | 4/2001 | Stasko | G01R 31/3828 320/149 |
| 6,239,579 B1 * | 5/2001 | Dunn | H02J 7/0022 320/121 |
| 6,661,200 B2 * | 12/2003 | Odaohhara | H02J 7/0029 320/132 |
| 6,832,148 B1 * | 12/2004 | Bennett | B60W 10/06 701/54 |
| 6,879,133 B1 * | 4/2005 | Geren | H02J 7/00304 320/134 |
| 6,946,818 B2 | 9/2005 | Cawthorne et al. | |
| 7,233,128 B2 * | 6/2007 | Brost | H02J 7/1461 320/132 |
| 7,680,613 B2 * | 3/2010 | Lim | H02J 7/00712 702/63 |
| 7,688,032 B2 * | 3/2010 | Kamishima | G01R 31/3828 320/132 |
| 7,768,235 B2 * | 8/2010 | Tae | B60L 58/25 320/134 |
| 8,274,291 B2 * | 9/2012 | Tsuchiya | G01R 31/367 324/426 |
| 8,543,273 B2 * | 9/2013 | Pfefferl | B60W 10/184 701/22 |
| 8,624,559 B2 * | 1/2014 | Syed | B60L 58/10 320/162 |
| 8,664,960 B2 * | 3/2014 | Tsuchiya | G01R 31/367 324/426 |
| 8,718,848 B2 * | 5/2014 | Pfefferl | H02P 29/027 701/22 |
| 8,880,253 B2 * | 11/2014 | Li | B60W 10/26 701/22 |
| 9,026,389 B2 * | 5/2015 | Shigemizu | G01R 31/3828 702/63 |
| 9,069,047 B2 * | 6/2015 | Nallabelli | H04W 52/0277 |
| 9,073,437 B2 * | 7/2015 | Matsumoto | B60L 58/15 |
| 9,145,132 B2 * | 9/2015 | Sato | B60W 20/13 |
| 9,212,468 B2 * | 12/2015 | Sugiyama | H01M 10/44 |
| 9,222,984 B2 * | 12/2015 | Iwasaki | H02J 3/32 |
| 9,340,118 B2 * | 5/2016 | Endo | B60L 11/1846 |
| 9,352,662 B2 * | 5/2016 | Kaneyasu | B60L 53/30 |
| 9,608,468 B2 * | 3/2017 | Kikuchi | H02J 7/007192 |
| 9,635,478 B1 * | 4/2017 | Mazanec | H04R 25/305 |
| 9,776,519 B2 * | 10/2017 | Chander | B60L 53/14 |
| 9,840,161 B2 | 12/2017 | Chikkannanavar et al. | |
| 9,843,069 B2 * | 12/2017 | Marcicki | H01M 10/4257 |
| 9,925,888 B2 * | 3/2018 | Chang | B60L 11/1861 |
| 9,981,567 B2 * | 5/2018 | Kawano | B60L 53/51 |
| 10,114,079 B2 * | 10/2018 | Duan | B60L 3/12 |
| 10,124,789 B2 | 11/2018 | Chang et al. | |
| 10,147,983 B2 * | 12/2018 | Kawahara | H01M 10/48 |
| 10,220,835 B2 * | 3/2019 | Jorgensen | B60W 10/08 |
| 10,254,345 B2 * | 4/2019 | Tani | B60L 58/12 |
| 10,399,452 B2 * | 9/2019 | Wang | B60L 58/10 |
| 10,534,040 B2 * | 1/2020 | Shinozaki | G01R 31/392 |
| 10,553,896 B2 * | 2/2020 | Marcicki | H01M 10/0525 |
| 10,725,108 B2 * | 7/2020 | Takahashi | G01R 31/3835 |
| 10,838,013 B2 * | 11/2020 | Tenmyo | H01M 10/441 |
| 2002/0014879 A1 * | 2/2002 | Koike | H02J 7/0069 320/133 |
| 2002/0138971 A1 * | 10/2002 | Onishi | H01M 10/6556 29/623.1 |
| 2002/0167294 A1 * | 11/2002 | Odaohhara | H02J 7/0029 320/132 |
| 2005/0077867 A1 * | 4/2005 | Cawthorne | B60K 6/445 320/104 |
| 2006/0022642 A1 * | 2/2006 | McGee | H02J 7/1461 320/132 |
| 2006/0087280 A1 * | 4/2006 | Miyashita | H01M 50/572 320/104 |
| 2006/0255768 A1 * | 11/2006 | Yoshio | H02J 7/0029 320/134 |
| 2006/0276980 A1 * | 12/2006 | Mizuno | G01R 31/3648 702/63 |
| 2007/0069735 A1 * | 3/2007 | Graf | G01R 31/382 324/416 |
| 2008/0074082 A1 * | 3/2008 | Tae | B60L 58/15 320/136 |
| 2008/0091364 A1 * | 4/2008 | Lim | H02J 7/0077 702/63 |
| 2008/0157777 A1 * | 7/2008 | Yamabe | G01R 31/3648 324/426 |
| 2008/0304199 A1 * | 12/2008 | Cruise | H01M 10/4207 361/101 |
| 2009/0001992 A1 * | 1/2009 | Tsuchiya | G01R 31/367 324/426 |
| 2009/0051322 A1 * | 2/2009 | Kubota | B60K 6/46 320/134 |
| 2009/0155674 A1 * | 6/2009 | Ikeuchi | H01M 10/44 429/91 |
| 2010/0119881 A1 * | 5/2010 | Patel | H01M 10/0525 429/7 |
| 2010/0217484 A1 * | 8/2010 | Mizuno | F02N 11/0818 701/36 |
| 2011/0046828 A1 * | 2/2011 | Chander | B60L 53/14 701/22 |
| 2012/0074904 A1 * | 3/2012 | Rutkowski | H01M 10/44 320/112 |
| 2012/0091971 A1 * | 4/2012 | Syed | H01M 10/48 320/162 |
| 2012/0268059 A1 * | 10/2012 | Nishikawa | H02J 7/0077 320/106 |
| 2012/0274276 A1 * | 11/2012 | Endo | B60L 53/65 320/109 |
| 2012/0293121 A1 * | 11/2012 | Horii | G01R 31/382 320/109 |
| 2012/0316713 A1 * | 12/2012 | Pfefferl | H02P 29/62 701/22 |
| 2013/0006454 A1 * | 1/2013 | Li | B60W 20/13 701/22 |
| 2013/0018569 A1 * | 1/2013 | Sangameswaran | F02N 11/0825 701/112 |
| 2013/0038292 A1 * | 2/2013 | Barrett | G01R 31/367 320/134 |
| 2013/0049973 A1 * | 2/2013 | Matsumoto | B60L 58/15 340/636.12 |
| 2013/0065093 A1 * | 3/2013 | White | H01M 10/42 429/50 |

(56) References Cited

U.S. PATENT DOCUMENTS

| | | | | |
|---|---|---|---|---|
| 2013/0069659 | A1* | 3/2013 | Iwasaki | G01R 31/382 324/426 |
| 2013/0115515 | A1* | 5/2013 | Hallac | H01M 10/4235 429/223 |
| 2013/0204472 | A1* | 8/2013 | Pfefferl | B60W 10/08 701/22 |
| 2013/0282241 | A1* | 10/2013 | Sugiyama | E02F 9/2091 701/50 |
| 2013/0320923 | A1* | 12/2013 | Hooker | B60L 53/14 320/109 |
| 2013/0338867 | A1* | 12/2013 | Sato | B60W 50/0205 701/22 |
| 2014/0172333 | A1* | 6/2014 | Gopalakrishnan | G01R 31/3835 702/63 |
| 2014/0184235 | A1* | 7/2014 | Ikeuchi | H01M 10/441 324/427 |
| 2014/0184236 | A1* | 7/2014 | Ohkawa | G01R 31/3835 324/433 |
| 2014/0197790 | A1* | 7/2014 | Eyasu | B60L 53/16 320/109 |
| 2014/0247018 | A1* | 9/2014 | Kikuchi | H02J 7/007192 320/150 |
| 2014/0292524 | A1* | 10/2014 | Nallabelli | H02J 7/0047 340/636.1 |
| 2015/0066262 | A1* | 3/2015 | Chang | B60L 58/21 701/22 |
| 2016/0036026 | A1* | 2/2016 | Kano | H01M 10/0567 429/126 |
| 2016/0093927 | A1* | 3/2016 | Marcicki | H01M 10/482 429/50 |
| 2016/0116544 | A1* | 4/2016 | Li | G01R 31/382 324/427 |
| 2016/0351976 | A1* | 12/2016 | Kawahara | B60L 50/51 |
| 2017/0101029 | A1* | 4/2017 | Kawano | B60L 58/14 |
| 2017/0145977 | A1* | 5/2017 | Toyama | B60L 15/20 |
| 2017/0225584 | A1* | 8/2017 | Jin | G01R 31/392 |
| 2017/0242079 | A1* | 8/2017 | Duan | B60L 58/13 |
| 2017/0253140 | A1* | 9/2017 | Chang | G01R 31/396 |
| 2017/0259687 | A1* | 9/2017 | Chikkannanavar | B60L 58/12 |
| 2018/0053965 | A1* | 2/2018 | Marcicki | H01M 10/4257 |
| 2018/0056790 | A1* | 3/2018 | Symanow | B60K 6/448 |
| 2018/0154791 | A1* | 6/2018 | Homma | B60L 53/665 |
| 2018/0194245 | A1* | 7/2018 | Mohr | B60L 11/1861 |
| 2018/0251121 | A1* | 9/2018 | Jorgensen | B60W 10/08 |
| 2018/0290552 | A1* | 10/2018 | Chen | B60L 58/15 |
| 2018/0292464 | A1* | 10/2018 | Shinozaki | H01M 8/04664 |
| 2018/0297474 | A1* | 10/2018 | Lee | H02J 7/14 |
| 2019/0009686 | A1* | 1/2019 | Wang | B60L 3/12 |
| 2019/0064282 | A1* | 2/2019 | Haga | B60L 3/12 |
| 2019/0092230 | A1* | 3/2019 | Mohr | H01M 10/4228 |
| 2019/0094305 | A1* | 3/2019 | Takechi | G01R 31/364 |
| 2019/0113580 | A1* | 4/2019 | Tenmyo | G01R 31/3842 |
| 2020/0003844 | A1* | 1/2020 | Lim | H02J 7/0063 |
| 2020/0094707 | A1* | 3/2020 | Fukushima | B60L 58/13 |
| 2020/0127337 | A1* | 4/2020 | Kim | H01M 10/0525 |
| 2020/0357197 | A1* | 11/2020 | Chen | H01M 10/486 |
| 2021/0063492 | A1* | 3/2021 | Chen | F02N 11/0825 |
| 2021/0135564 | A1* | 5/2021 | Ge | H03K 17/602 |

FOREIGN PATENT DOCUMENTS

| | | | | |
|---|---|---|---|---|
| EP | 1580865 | A1 * | 9/2005 | H02J 7/00304 |
| EP | 1914559 | A2 * | 4/2008 | H02J 7/0077 |
| JP | 2005199908 | A * | 7/2005 | |
| JP | 2010081762 | A * | 4/2010 | |
| JP | 4572775 | B2 * | 11/2010 | |
| JP | 2011069686 | A * | 4/2011 | |
| JP | 5741153 | B2 * | 7/2015 | |
| JP | 2018077999 | A * | 5/2018 | |
| WO | WO-2018196121 | A1 * | 11/2018 | G01R 31/36 |

OTHER PUBLICATIONS

Analog Devices, Inc., *Lithium Ion Battery Monitoring System*, 2011, 48 pages.

\* cited by examiner

METHODS AND SYSTEMS FOR VEHICLE BATTERY CELL FAILURE DETECTION AND OVERCHARGE PROTECTION

TECHNICAL FIELD

The present disclosure generally relates to vehicle battery control systems and methods and, more specifically, systems and methods for determining vehicle battery cell failure or shorting, and for protecting vehicle batteries from overcharging.

BACKGROUND

Modern vehicles may include one or more lead acid batteries for providing power to various vehicle systems. With proper operation conditions, the lead acid battery of a given vehicle can have long usable life. Vehicle lead acid batteries, in particular, may operate under more severe operation conditions than a battery used in industry. As such, the typical usable life may be less than 10 years for a vehicle battery.

In some 12-volt lead-acid batteries there are six cells connected in series. These batteries can fail due to one or more cells in the battery being shorted. When one cell is shorted, a voltage provided by the battery will be substantially lower than an expected value and the battery will not be able to support a qualified engine crank and provide sufficient power to other vehicle loads.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle battery management in a vehicle. An example disclosed method includes determining an initial amp-hour value for a vehicle battery of a vehicle. The method also includes measuring a net integrated amp-hour value added into the vehicle battery during a first time period. The method further includes determining that the initial amp-hour value plus the net integrated amp hour value is greater than a threshold percentage of a rated capacity of the vehicle battery. And the method still further includes responsively providing an alert to a driver.

An example disclosed vehicle includes a vehicle battery and a power control system. The power control system is configured to determine an initial amp-hour value for the vehicle battery. The power control system is also configured to measure a net integrated amp-hour value added into the vehicle battery during a first time period. The power control system is further configured to determine that the initial amp-hour value plus the net integrated amp hour value is greater than a threshold percentage of a rated capacity of the vehicle battery. And the power control system is still further configured to responsively provide an alert.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
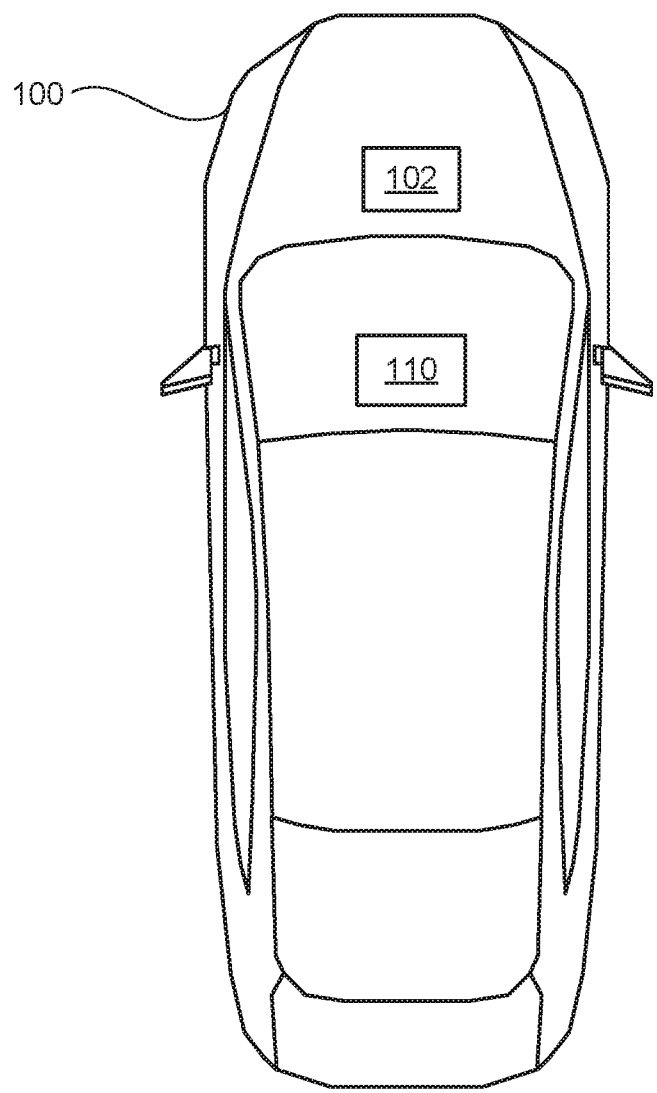
FIG. 1 illustrates an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, example embodiments disclosed herein are directed to detecting vehicle battery cell failure or shorting, and taking appropriate actions to alert a driver. Existing systems are unable to reliably detect shorted cells in a vehicle battery, particularly for batteries with prematurely shorted cells (i.e., for batteries with very small and/or intermittent shortage path between anode and cathode of a cell, which are still capable of providing enough output electric power for engine cranking and to support vehicle electric load after these batteries are charged). In some existing solutions, methods for detecting shorted cells in vehicle batteries require special procedures for detection that include maintaining carefully controlled and accurately measured voltage, current, temperature, state of charge (SOC), battery aging status, and require a relatively long test time with voltage kept in a stabilized constant value. While the testing is under way with existing solutions, various vehicle functions such as Smart-Regenerative-Charging (SRC) and engine auto Start-Stop (SS) are disabled. This can lead to reduced fuel efficiency and comfort for the driver. Therefore, there is a need for methods and systems to detect shorted cells in a vehicle battery in the field (i.e., not in a laboratory setting) that are robust and reliable without interruption of vehicle normal operation such as SRC and SS for best vehicle fuel-economy and emission.

In most cases where a battery cell becomes shorted, the battery cell shortage starts with a very small shorted pass between anode and cathode of a battery cell. During this early stage of the shorted cell, the battery will still be able to crank the vehicle engine properly and sufficiently support other vehicle electric loads. The shortage will increase gradually over time with normal vehicle usage. Under certain conditions, the short will start to develop quickly, causing the battery to lose its capability to support vehicle electric loads. In this circumstance, vehicle operation may be severely affected—the engine may stall due to a disabled alternator in SRC mode; the engine may fail to start when in auto start-stop (SS); other critical operations may fail such as power assisted steering, and more. Existing solutions do not provide sufficiently robust and reliable methods and systems for dealing with these issues.

Examples disclosed herein, however, may provide innovative solutions to the issues noted above. For example, battery cell shorting may be detected based on ampere-hour (amp-hour or "AH") measurements of the battery. An integrated value of the battery AH charging and discharging over time may correspond to the battery health, such that failure can be detected quickly and accurately, such that vehicle functions like SRC and SS can remain in use up to the point a failure is detected. This allows the vehicle to operate using more available functions during a larger percentage of the battery life, thereby increasing the overall fuel economy of the vehicle.

An example method may include determining an initial amp-hour value for a vehicle battery of a vehicle. The method may then include measuring the net integrated amp-hour value added into the vehicle battery over time. The net integrated amp-hour value may be the amount of amp-hours charged into the battery minus the amount of amp-hours discharged from the battery. If the combined initial value plus the net value added is larger than a threshold level (e.g., 130% of the rated capacity of the battery), then the method may include providing an alert to a driver of the vehicle indicating that there is a battery cell shorted.

FIG. 1 illustrates an example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 includes parts related to mobility, such as a powertrain with an engine, a transmission, a suspension, a driveshaft, and/or wheels, etc. In the illustrated example, vehicle 100 may include one or more electronic components (described below with respect to FIG. 2).

As shown in FIG. 1, vehicle 100 may include a battery 102 and a power control system 110. The battery 102 may be any battery suitable for use in a vehicle. For instance, battery 102 may be a 12V lead-acid battery. Battery 102 may also have one or more corresponding metrics, such as a maximum capacity, a state of charge (SOC), temperature, voltage, current, and more. Over time, the capacity may degrade, such that a battery previously able to be charged to 100% capacity may only be able to reach 75% or lower, regardless of the time for which the battery is charged.

The battery control system 110 may include one or more processors and/or memory, and may be configured to carry out one or more method steps, functions, and/or actions such as those described herein. For example, the battery control system 110 may be configured to determine the initial amp-hour value for the vehicle battery 102, determine the net integrated amp-hour value added into the battery 102, determine that the combined initial value and net value are greater than a threshold percentage of the rated battery capacity, and responsively provide an alert. Other functions or actions are described in further detail below.

Figure 2:
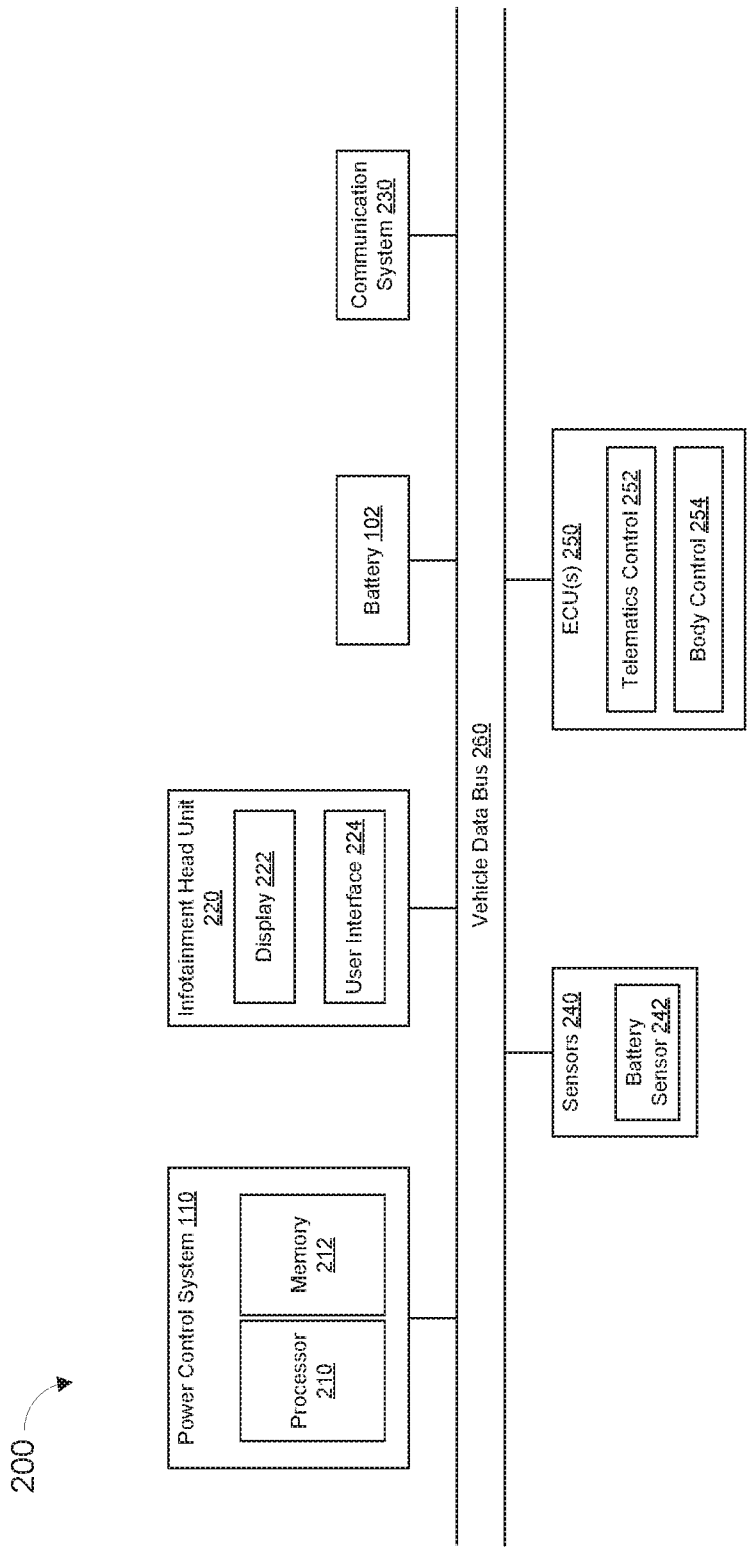
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include a power control system 110, infotainment head unit 220, battery 102, communication system 230, sensors 240, electronic control unit(s) 250, and vehicle data bus 260.

The power control system 110 may include a microcontroller unit, controller or processor 210 and memory 212.

The processor 210 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 210 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 222 and user interface 224, to receive input from and display information for the user(s). The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor and/or memory with on-board computing system 202. Additionally, the infotainment head unit 220 may display the infotainment system on, for example, a center console display of vehicle 100 (such as display 222).

The communication system 230 includes wired or wireless network interfaces to enable communication with external networks. The communication system 230 also includes hardware (e.g., processors, memory, storage, antenna, etc.) and software to control the wired or wireless network interfaces. In the illustrated example, the communication system 230 includes one or more communication controllers for cellular networks (e.g., Global System for Mobile Communications (GSM), Universal Mobile Telecommunications System (UMTS), Long Term Evolution (LTE), Code Division Multiple Access (CDMA)), Near Field Communication (NFC) and/or other standards-based networks (e.g., WiMAX (IEEE 802.16m), local area wireless network (including IEEE 802.11 a/b/g/n/ac or others), Wireless Gigabit (IEEE 802.11ad), etc.). In some examples, the communication system 230 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). In such examples, the vehicle 100 may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

The sensors 240 are arranged in and/or around the vehicle 100. For example, battery sensor 242 may be mounted to the battery 102 to measure a temperature of the battery 102 and/or one or more other battery characteristics such as battery voltage and current. Other sensors are possible as well.

The ECUs 250 may monitor and control subsystems of vehicle 100. One or more ECUs may be enabled, disabled, or otherwise modified to reduce a power draw of the ECU. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252 and the body control unit 254.

The telematics control unit 252 may control tracking of the vehicle 100, for example, using data received by a GPS receiver, communication module, and/or one or more sensors. The body control unit 254 may control various subsystems of the vehicle 100. For example, the body control unit 254 may control power a trunk latch, windows, power locks, power moon roof control, an immobilizer system, and/or power mirrors, etc.

Vehicle data bus 260 may include one or more data buses that communicatively couple the power control system 110, infotainment head unit 220, battery 102, communication system 230, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 260 may be a Media Oriented Systems Transport (MOST) bus, or a CAN flexible data (CAN-FD) bus (ISO 11898-7).

Referring back to FIG. 1, the power control system 110 may be configured to determine an initial amp-hour value for the vehicle battery 102. The amp-hour value for a given battery may correspond to the state of charge of the battery. For example, an estimate of the current amp-hour value of the battery 102 may be determined by multiplying the current state of charge by the rated amp-hour capacity of the battery 102. The amp-hour value for the battery indicates how much charge the battery holds.

Each battery may have a rated capacity, such as 60 AH for example. The rated capacity may be determined based on an industry standard procedure, wherein the rated capacity comprises the total amp-hour value discharged to bring the fully charged battery to a fully discharged status, using a particular standard discharging procedure.

In some examples, the initial amp-hour value may be determined based on an open circuit voltage of the vehicle battery. Where the open circuit value is not available, or is not accurate enough, the initial amp-hour value may instead be determined based on a battery voltage and discharging current from the battery. Still further, the initial amp-hour value may be determined at a time when the vehicle transitions from an off state to an on state (i.e., right when or shortly after vehicle ignition is turned). Alternatively, the initial amp-hour value may be determined just prior to the vehicle being turned on or switching from an off state to an on state.

In some examples, one or more vehicle actions or events can cause the initial amp-hour value to be reset, re-determined, and/or reevaluated. For instance, the power control system may determine the initial amp-hour value after a hood or trunk of the vehicle is closed (depending on where the battery terminals are located). If the hood or trunk is open, that may indicate that the vehicle is being used to jump another vehicle, which can interfere with the calculations and decision-making of the power control system. The power control system 110 may initiate a new determination of the initial amp-hour value upon determining that the vehicle hood or trunk transitions to a closed state.

The power control system 110 may also be configured to measure a net integrated amp-hour value added into the vehicle battery 102 during a first time period. The net integrated amp-hour value comprises an amount of amp-hours charged into the vehicle battery less an amount of amp-hours discharged from the vehicle battery during the first time period. This amount, when it results in the total amp-hour value of the battery reaching greater than 100% of capacity, can be a proxy or indication of the amount of energy lost to gassing, heat, and of other losses in the system.

Typically, when recharging the battery 102 there are losses of energy due to gasses caused by the recharging process. During charging of an example lead-acid battery, most of electric energy may be used to convert PbSO4 on a negative plate into dilute H2SO4 and Pb in positive plate. At the same time, some of the input charging energy is consumed by gassing (i.e., water decomposition) in the battery. Gassing nearly always occurs when charging, and small gassing in a lead-acid battery is acceptable in vehicle operation. After fully charging the battery, the charged amp-hour into the battery will be slightly higher than battery rated capacity in amp-hour. For example, in a laboratory example, a 16V charging voltage (2.67V per cell for each of 6 cells) applied for up to 24 hour may be used to prepare a fully charged battery in lab test. The total charged amp-hour under these conditions may be about 120% or less of the rated battery capacity. That corresponds to an approximate 20% loss of charge that is converted to gas (i.e., water decomposition).

The power control system 110 may be configured to determine the net integrated amp-hour value with a relatively fast sampling rate (e.g., every 40 ms) based on a measured battery current of the battery 102.

The power control system 110 may then evaluate the combined initial amp-hour value and the net integrated amp-hour value added to the battery 102. This may be referred to as the total amp-hour value. If the total amp-hour value is greater than a first threshold percentage of the rated capacity of the battery during a first time period, that may indicate there are issues with the battery 102. For example, if the total amp-hour value is greater than 130% of the rated capacity of the battery 102 over a period of time less than five hours, that may indicate that there is a cell shorted, or an improperly high charging voltage.

It should be appreciated that the time period (and threshold percentage of rated capacity) may vary from the examples disclosed. Five hours (and 130%) is included for example only. The longer that a battery is charged, the more energy is lost to gassing. As such, even a perfectly healthy battery may be overcharged to 130% of capacity after a sufficiently long period of time, even with proper charging voltage and no shorted cells. However, if the battery is charged to 130% of capacity in a relatively short period of time (e.g., less than 5 hours), that indicates an improperly high charging voltage and/or a shorted cell.

The time period may be measured from the point in time at which the initial amp-hour value was determined, or from the point in time at which vehicle ignition is on and the vehicle has been starting to charge the battery.

The total amp-hour value (i.e., initial amp-hour value plus net integrated amp-hour value) is typically only greater than 120% under a few circumstances. First, when there is a shorted cell in the battery charged with a nominal charging voltage, it causes an increased voltage on the remaining non-shorted cells. This in turn causes increased gassing by the remaining cells. Second, when there is an improperly high charging voltage, it causes increased gassing in all cells. And third, when the battery has been charged for an unexpectedly long time, sufficient gassing is able to occur such that the loss in energy can reach 20% of the rated capacity. Even a fully charged battery will still have a charging current (although small). Thus over a long time period, e.g., 24 hours, the total amp-hour value may reach a high percentage such as 120% or more of the rated capacity.

With these three situations in mind, some example may include determining that the total amp-hour value is greater than 130% before a long time is reached, e.g. before five hours have elapsed since the initial amp-hour value was determined. This enables the system to avoid a false positive indication of a failed cell, since the added charge was likely lost due to ordinary gassing that occurred during the unexpectedly long charging time.

Responsive to determining that the initial amp hour value plus the net integrated amp hour value is greater than the threshold percentage of the rated capacity of the battery 102, the power control system 110 may be configured to provide an alert to the driver. The alert may indicate that there is a battery issue, such as a short or an improperly high charging voltage, and that the battery should be checked. The alert may be displayed on the center console display, or on any other vehicle display. In addition or alternatively, the alert may be transmitted to a remote computing device (such as central server of the manufacturer, a maintenance system, a mechanic, a mobile device associated with the vehicle owner, and more).

The power control system 110 may also be configured to responsively disable one or more vehicle functions, such as smart regenerative charging (SRC), automatic start-stop (SS), automatic vehicle control, cruise control, and more. Disabling or reducing the power draw of these functions enables the vehicle to avoid large battery charging/discharging currents, thereby reducing the load demands and temperature of battery.

In some examples, the power control system 110 may be configured to compare the total amp-hour value to a second, higher threshold percentage. For example, the power control system 110 may determine that the total amp-hour value is greater than 180% of the rated capacity during a second time period (e.g., 8 hours, 24 hours, etc.). The second threshold may be used to determine whether the battery 102 has entered a failure mode. In response to determining that the total amp-hour value is greater than the second threshold, the power control system may responsively provide a second alert, and/or further reduce one or more vehicle functions.

The power control system may also, responsive to determining that the tot al amp-hour value is greater than the second threshold, determine whether the charging voltage is greater than a threshold charging voltage level (e.g., 12.5V). If the charging voltage is less than the threshold charging voltage level, that may indicate that one or more cells of the battery 102 are shorted. However, if the charging voltage is greater than the threshold charging voltage, that may indicate that an improperly high charging voltage has been used by the alternator, DC-DC converter, or some other component of the power control system.

In some examples, the power control system 110 is also configured to, responsive to determining that the initial amp-hour value plus the net integrated amp hour value is greater than the threshold percentage of the rated capacity of the vehicle battery (e.g., the total amp-hour value is greater than the first threshold) modify a charging voltage of the vehicle battery such that a corresponding charging current is less than a threshold charging current. After modifying the charging voltage, the power control system 110 may determine that the charging voltage of the vehicle battery is less than a threshold charging voltage. And then the power control system 110 may responsively (i) provide a second alert to the driver indicating that there is a shorted cell in the vehicle battery, and (ii) disable one or more vehicle functions.

In other words, upon determining that the total amp-hour value is greater than the first threshold (e.g., 130% of rated capacity), the power control system 110 may reduce the charging voltage until a corresponding charging current is less than a threshold charging current (e.g., 2 A). If the charging voltage required to reduce the charging current below the threshold is less than a threshold charging voltage (e.g., 12V), that indicates that there is a shorted cell. This is because a reduced charging current of less than 2 A should still correspond to a charging voltage of greater than 12V about 13V for a normally functioning 12-volt lead acid battery which has been charged for more than 130% of rated AmpHour. However, if there is a shorted cell, the charging voltage will could be below 12V while there is still current charged into the battery with this low voltage.

In response to determining that the charging voltage is less than the threshold charging voltage, the power control system 110 may disable one or more vehicle functions, provide an alert, or take any other action described herein.

However if the charging voltage is greater than a threshold charging voltage (e.g., greater than 13.0V), that may indicate that an improperly high charging voltage is the cause of the total amp-hour value reaching the high threshold (e.g., 130% of rated capacity). In response, the power control system 110 may provide an alert, reduce a charging voltage, and/or take none or more other actions such as those described herein.

In some examples, the power control system 110 is also configured to determine that the initial amp-hour value is greater than an initial amp hour threshold. The initial amp-hour threshold may be, for example, 10% of the rated capacity. The power control system 110 may then determine that a charging voltage of the vehicle battery is less than a charging voltage threshold. The charging voltage threshold may be, for example, 11.5V. In response to these determinations, the power control system 110 may (i) provide an alert to the driver indicating that there is a shorted cell in the vehicle battery, and (ii) disable one or more vehicle functions.

This can include disabling the SRC, SS, automatic control, cruise control, and other functions. For a 12V lead-acid battery charged with 10% of its rated capacity, its minimum open circuit voltage under nominal operating conditions will be higher than 11.6V. For a 12V lead-acid battery with one fully shorted cell, after being charged with 10% of its rated capacity, the battery maximum open circuit voltage under nominal operating conditions will be lower than 10.8V (=⅚*13V). These facts are used to distinguish between a battery with a shorted cell and a battery without a shorted cell.

Figure 3:
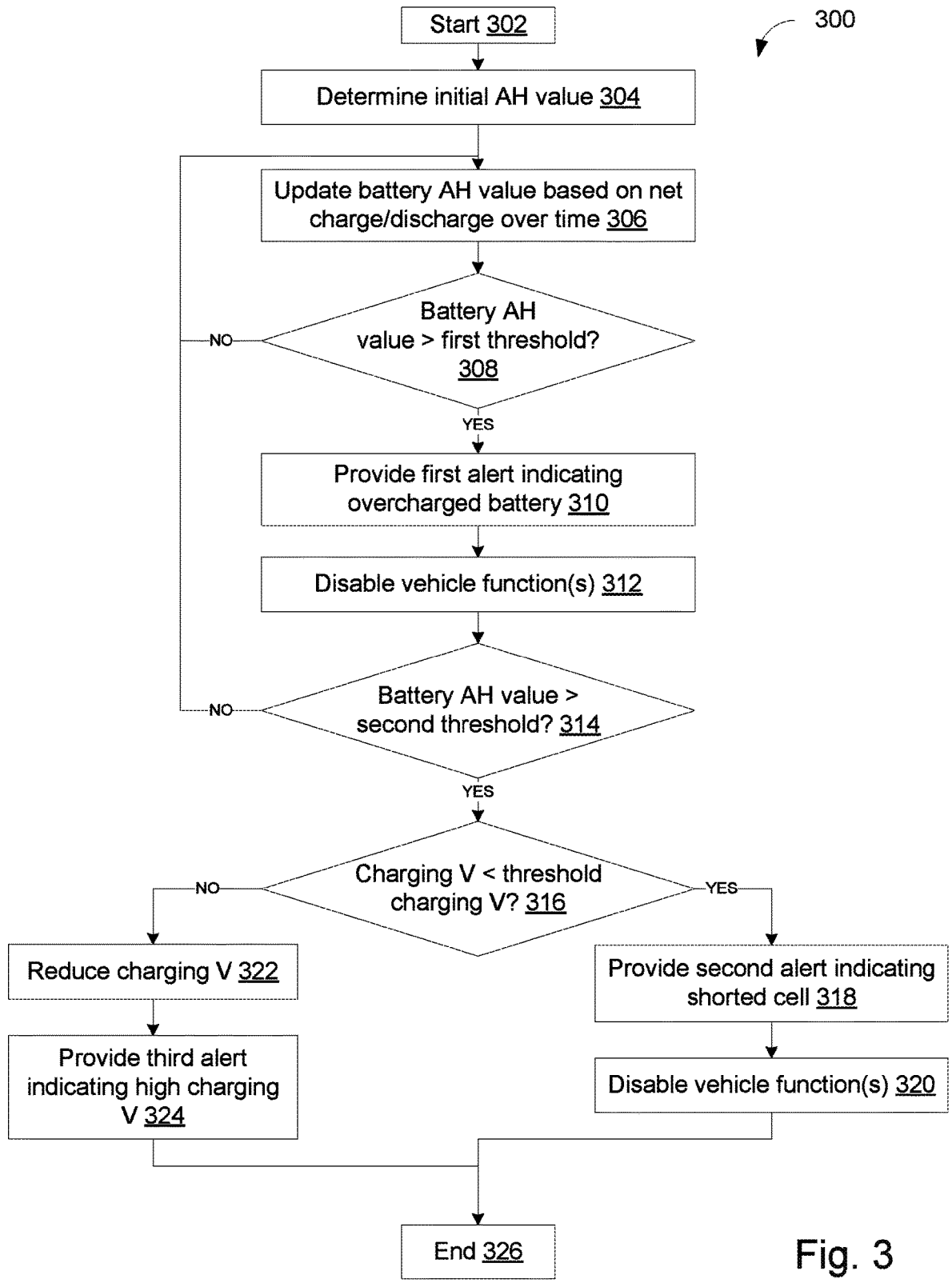
FIG. 3 illustrates a flowchart of an example method according to embodiments of the present disclosure.
Figure 4:
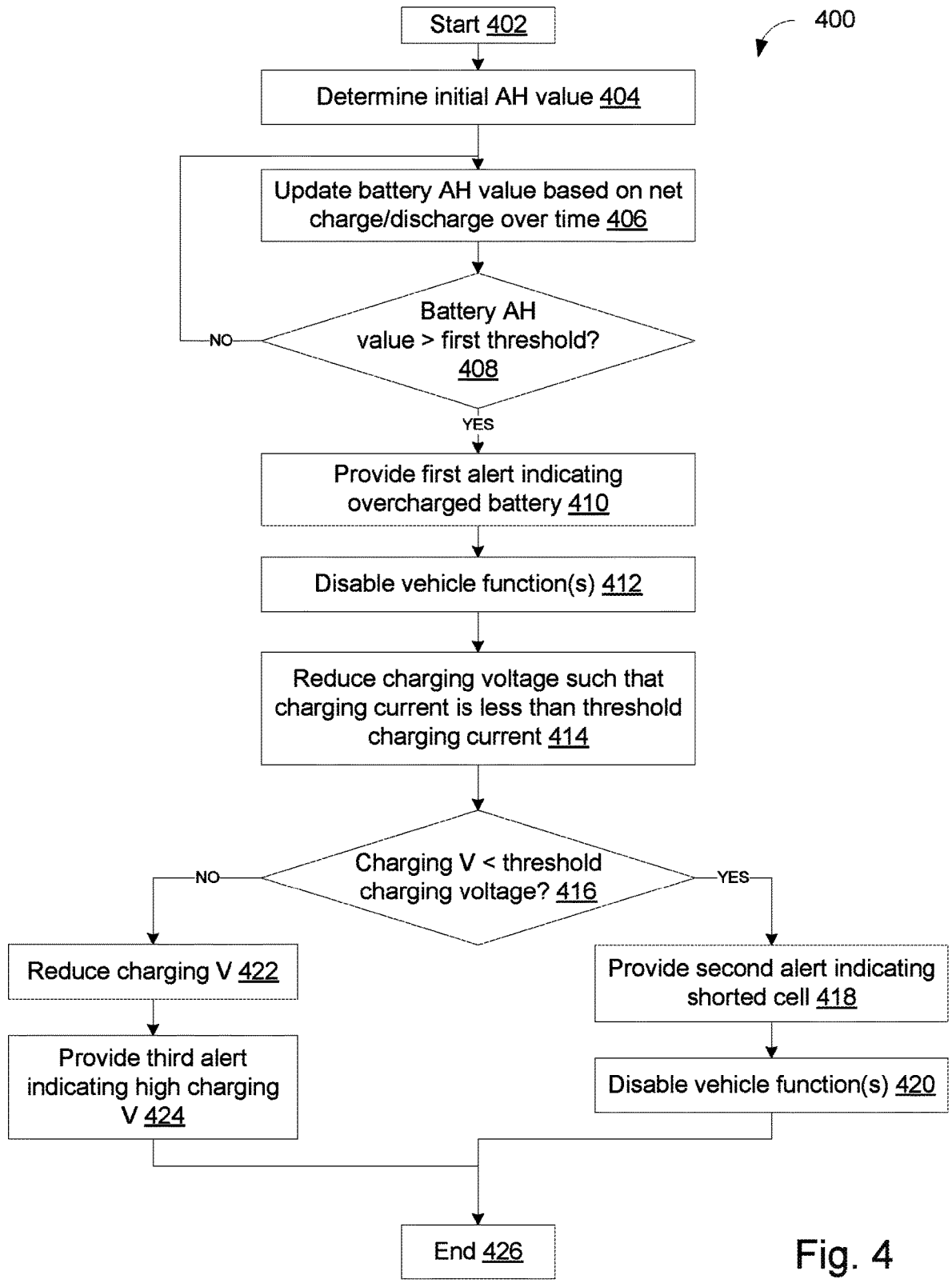
FIG. 4 illustrates a flowchart of another example method according to embodiments of the present disclosure.

FIGS. 3 and 4 illustrate flowcharts of example methods 300 and 400 according to embodiments of the present disclosure. Methods 300 and 400 may enable one or more systems to determine the status of a vehicle battery, particularly whether one or more cells of the battery are shorted, and to carry out one or more actions based on the vehicle battery status. The flowcharts of FIGS. 3 and 4 are representative of machine readable instructions that are stored in memory (such as memory 212) and may include one or more programs which, when executed by a processor (such as processor 210) may cause vehicle 100 and/or one or more systems or devices to carry out one or more functions described herein. While the example programs are described with reference to the flowcharts illustrated in FIGS. 3 and 4, many other methods for carrying out the functions described herein may alternatively be used. For example, the order of execution of the blocks may be rearranged or performed in series or parallel with each other, blocks may be changed, eliminated, and/or combined to perform methods 300 and 400. Further, because methods 300 and 400 are disclosed in connection with the components of FIGS. 1-2, some functions of those components will not be described in detail below.

Method 300 starts at block 302. At block 304, method 300 may include determining an initial amp-hour value. AS noted above, the initial amp-hour value may be determined based on an open circuit voltage, or based on a battery voltage and discharging current of the battery.

At block 304, method 300 may include updating the battery amp-hour value based on a net charge/discharge over time. This may include determining the total amp-hour value, which comprises the initial amp-hour value added to the net integrated amp-hour value.

At block 308, method 300 may include determining whether the total amp-hour value is greater than a first threshold. The first threshold may be a threshold percentage of the rated capacity of the battery (e.g., 130% of the rated capacity). Block 308 may also include determining whether the threshold has been met during a particular time period, such as less than a threshold amount of time after the initial amp-hour value was determined (e.g., within five hours).

If the total amp-hour value is greater than the first threshold, method 300 may include providing a first alert indicating that the battery is overcharged at block 310. The alert may be provided on a display of the vehicle, and/or transmitted to a remote computing device. At block 312, method 300 may include disabling one or more vehicle functions, such as SRC, SS, autonomous control, cruise control, and more.

At block 314, method 300 may include determining whether the total amp-hour value is greater than a second threshold. The second threshold may be higher than the first threshold (e.g., 180% of the rated capacity).

At block 316, method 300 may include determining whether the charging voltage is less than a threshold charging voltage. The threshold charging voltage may be between 13.3 to 15.2V and may depend on the battery temperature.

If the charging voltage is below this threshold charging voltage (based on temperature), method 300 may include providing a second alert indicating that a battery cell has been shorted at block 318. And at block 320, method 300 may include disabling one or more vehicle functions (or further disabling additional functions).

However if the charging voltage is greater than the threshold charging voltage (based on temperature), that indicates that there is not likely a shorted cell, and that the cause of the over charged amp-hour value was an improperly high charging voltage. Block 322 may then include reducing the charging voltage by causing the alternator and/or DC-DC converter to reduce a voltage. Block 324 may then include providing a third alert indicating that the battery experienced an abnormally high charging voltage. Method 300 may then end at block 326.

Method 400 may include one or more blocks that are similar or identical to those of method 300, For example, blocks 402-412 may be similar or identical to blocks 302-312 of method 300. As such they are not described in detail.

At block 414, method 400 may include reducing a charging voltage of the battery, such that a corresponding charging current less than a threshold charging current while there is still charging current into the battery. For example, this may include reducing the charging voltage until the corresponding charging current is reduced to less than two amps and larger than 0 amp (battery is still under charging but not under discharging).

At block 416, method 400 may include determining whether the resulting charging voltage (that caused the current to be less than the threshold charging current) is less than a threshold charging voltage. For example, the threshold charging voltage may be 12V, and the threshold charging current may be 2 A. As such, block 416 may include determining whether the reduced charging voltage dropped below 12V in order to cause the charging current to drop below 2 A.

If the charging voltage is less than the threshold charging voltage, that may indicate that one or more battery cells are shorted. AT block 418, method 400 may include providing a second alert indicating that the battery has a shorted cell. And at block 420, method 400 may include disabling one or more vehicle functions, either in addition to those previously disabled or maintaining the disabled status.

However, if the resulting charging voltage is greater than a threshold charging voltage, even when the charging current is less than the threshold charging current (e.g., 0 A<charging current<2 A), that may indicate that the cause of the overcharged amp-hours was an improperly high charging voltage. Method 400 may then include reducing the charging voltage (e.g., causing a modification to the alternator and/or DC-DC converter) at block 422. And at block 424, method 400 may include providing a third alert indicating that the battery was charged with too high of a voltage. Method 400 may then end at block 426.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A method comprising:
   determining an initial amp-hour value for a vehicle battery of a vehicle;
   measuring a net integrated amp-hour value added into the vehicle battery during a first time period;
   determining that the initial amp-hour value plus the net integrated amp-hour value is greater than a threshold percentage of a rated capacity of the vehicle battery;
   responsive to determining that the initial amp-hour value plus the net integrated amp-hour value is greater than the threshold percentage of the rated capacity of the vehicle battery, modifying a charging voltage of the vehicle battery such that a corresponding charging current is less than a threshold charging current;
   after modifying the charging voltage, determining that the charging voltage of the vehicle battery is less than a threshold charging voltage; and
   responsively (i) providing an alert indicating that there is a shorted cell in the vehicle battery, and (ii) disabling one or more vehicle functions.

2. The method of claim 1, further comprising determining the initial amp-hour value based on an open circuit voltage of the vehicle battery at a time when the vehicle transitions from an off state to an on state.

3. The method of claim 1, further comprising determining the initial amp-hour value based on a battery voltage and a discharging current of the vehicle battery at a time when the vehicle transitions from an off state to an on state.

4. The method of claim 1, wherein the net integrated amp-hour value comprises an amount of amp-hours charged into the vehicle battery less an amount of amp-hours discharged from the vehicle battery during the first time period.

5. The method of claim 1, wherein the first time period comprises five hours of vehicle operation.

6. The method of claim 1, wherein the threshold percentage of the rated capacity of the vehicle battery comprises 130% of the rated capacity of the vehicle battery.

7. The method of claim 1, further comprising responsively disabling an automatic start-stop function and a smart regenerative charging function of the vehicle.

8. The method of claim 1, wherein the threshold charging current is two amps, and wherein the threshold charging voltage is 12 volts.

9. The method of claim 1, further comprising:
   determining that the initial amp-hour value is greater than an initial amp-hour threshold;
   determining that a charging voltage of the vehicle battery is less than a charging voltage threshold; and
   responsively (i) providing a second alert indicating that there is a shorted cell in the vehicle battery, and (ii) disabling one or more vehicle functions.

10. The method of claim 9, wherein the initial amp-hour threshold is 10% of the rated capacity of the vehicle battery, and wherein the charging voltage threshold is 11.5 volts.

11. A vehicle comprising:
    a vehicle battery; and
    a power control system configured to:
        determine an initial amp-hour value for the vehicle battery;
        measure a net integrated amp-hour value added into the vehicle battery during a first time period;
        determine that the initial amp-hour value plus the net integrated amp-hour value is greater than a threshold percentage of a rated capacity of the vehicle battery;
        determine that the initial amp-hour value is greater than an initial amp-hour threshold;
        determine that a charging voltage of the vehicle battery is less than a charging voltage threshold; and
        responsively (i) provide an alert indicating that there is a shorted cell in the vehicle battery, and (ii) disable one or more vehicle functions.

12. The vehicle of claim 11, wherein the power control system is further configured to determine the initial amp-hour value based on an open circuit voltage of the vehicle battery at a time when the vehicle transitions from an off state to an on state.

13. The vehicle of claim 11, wherein the power control system is further configured to determine the initial amp-hour value based on a battery voltage and a discharging current of the vehicle battery at a time when the vehicle transitions from an off state to an on state.

14. The vehicle of claim 11, wherein the net integrated amp-hour value comprises an amount of amp-hours charged into the vehicle battery less an amount of amp-hours discharged from the vehicle battery during the first time period.

15. The vehicle of claim 11, wherein the first time period comprises five hours of vehicle operation.

16. The vehicle of claim 11, wherein the threshold percentage of the rated capacity of the vehicle battery comprises 130% of the rated capacity of the vehicle battery.

17. The vehicle of claim 11, wherein the power control system is further configured to responsively disable an automatic start-stop function and a smart regenerative charging function of the vehicle.

18. The vehicle of claim 11, wherein the power control system is further configured to, responsive to determining that the initial amp-hour value plus the net integrated amp-hour value is greater than the threshold percentage of the rated capacity of the vehicle battery:
    modify a charging voltage of the vehicle battery such that a corresponding charging current is less than a threshold charging current;

after modifying the charging voltage, determine that the charging voltage of the vehicle battery is less than a threshold charging voltage; and responsively (i) provide a second alert indicating that there is a shorted cell in the vehicle battery, and (ii) disable one or more vehicle functions.

* * * * *